United States Patent
Corkum

[11] 3,880,264
[45] Apr. 29, 1975

[54] POWER SYSTEM
[75] Inventor: James L. Corkum, Enfield, Conn.
[73] Assignee: Alden Self-Transit Systems Corporation, Bedford, Mass.
[22] Filed: Oct. 19, 1973
[21] Appl. No.: 408,070

Related U.S. Application Data
[62] Division of Ser. No. 121,263, March 5, 1971, Pat. No. 3,786,762.

[52] U.S. Cl.................. 191/49; 191/45 R; 191/48
[51] Int. Cl.............................................. B60l 5/38
[58] Field of Search ....... 191/45 R, 48, 49, 59, 59.1

[56] References Cited
UNITED STATES PATENTS
| | | | |
|---|---|---|---|
| 2,921,146 | 1/1960 | Ericson | 191/45 R |
| 3,739,108 | 6/1973 | Payen | 191/59.1 |
| 3,786,204 | 1/1974 | Laurent | 191/49 |

Primary Examiner—M. Henson Wood, Jr.
Assistant Examiner—D. W. Keen

[57] ABSTRACT

A transportation system includes two power sources that extend along opposite sides of a right of way for an electrically powered vehicle. Each power source includes an elongated open side housing of electrically insulating material that defines a channel having opposed inner surfaces disposed at an angle to one another and tapering inwardly. A power conductor is disposed in each inner surface and a third power conductor is located at the innermost end of the channel substantially midway between the two inner surfaces. Each vehicle includes two power collector assemblies, each power collector assembly having a tapered head that carries three conductor members and is arranged for sliding engagement with the power source on its side of the vehicle.

5 Claims, 7 Drawing Figures

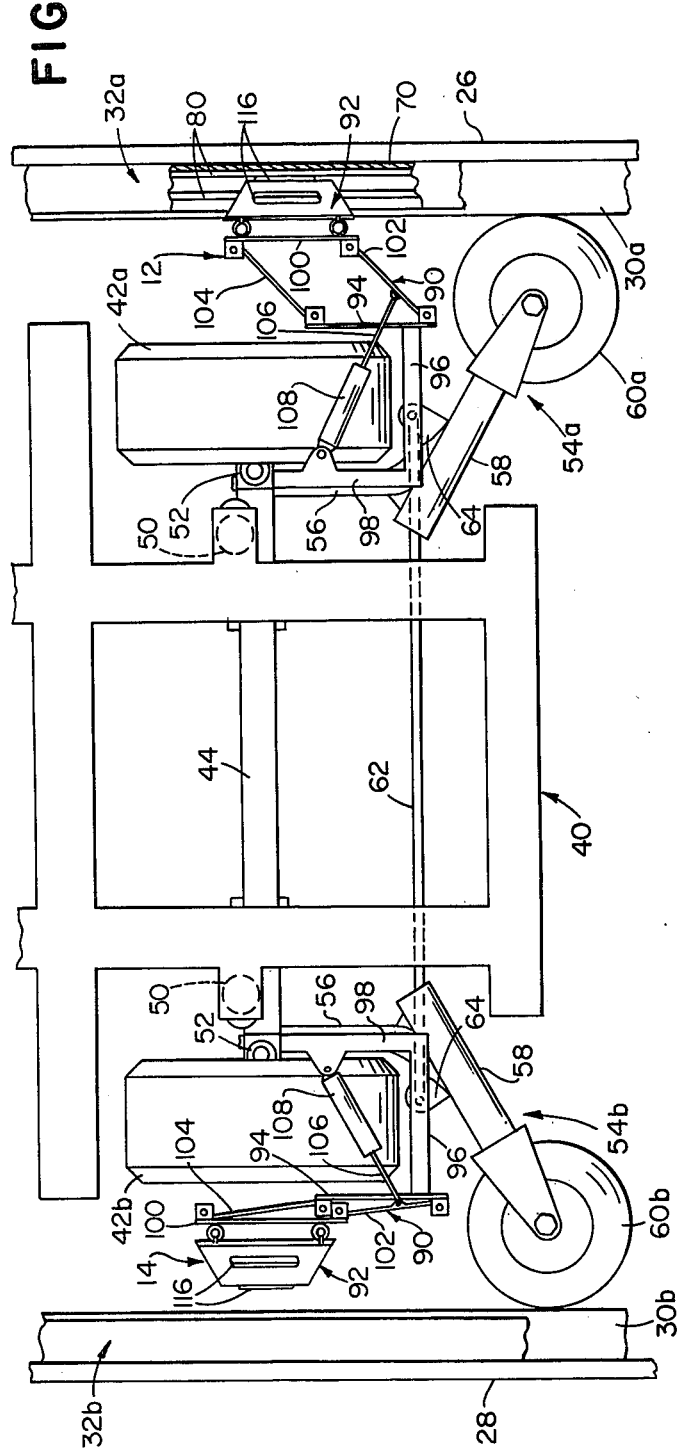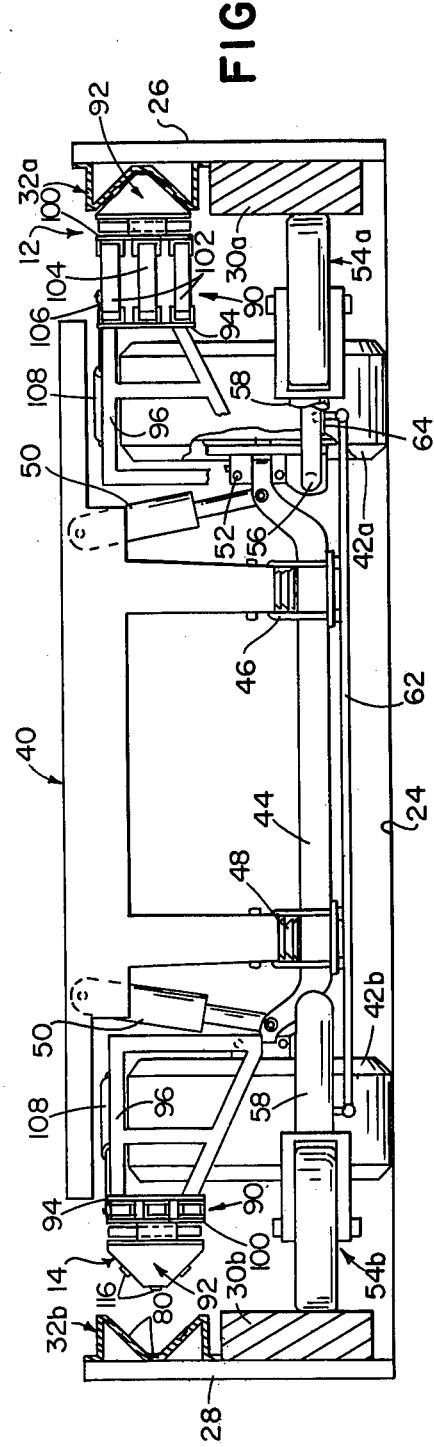

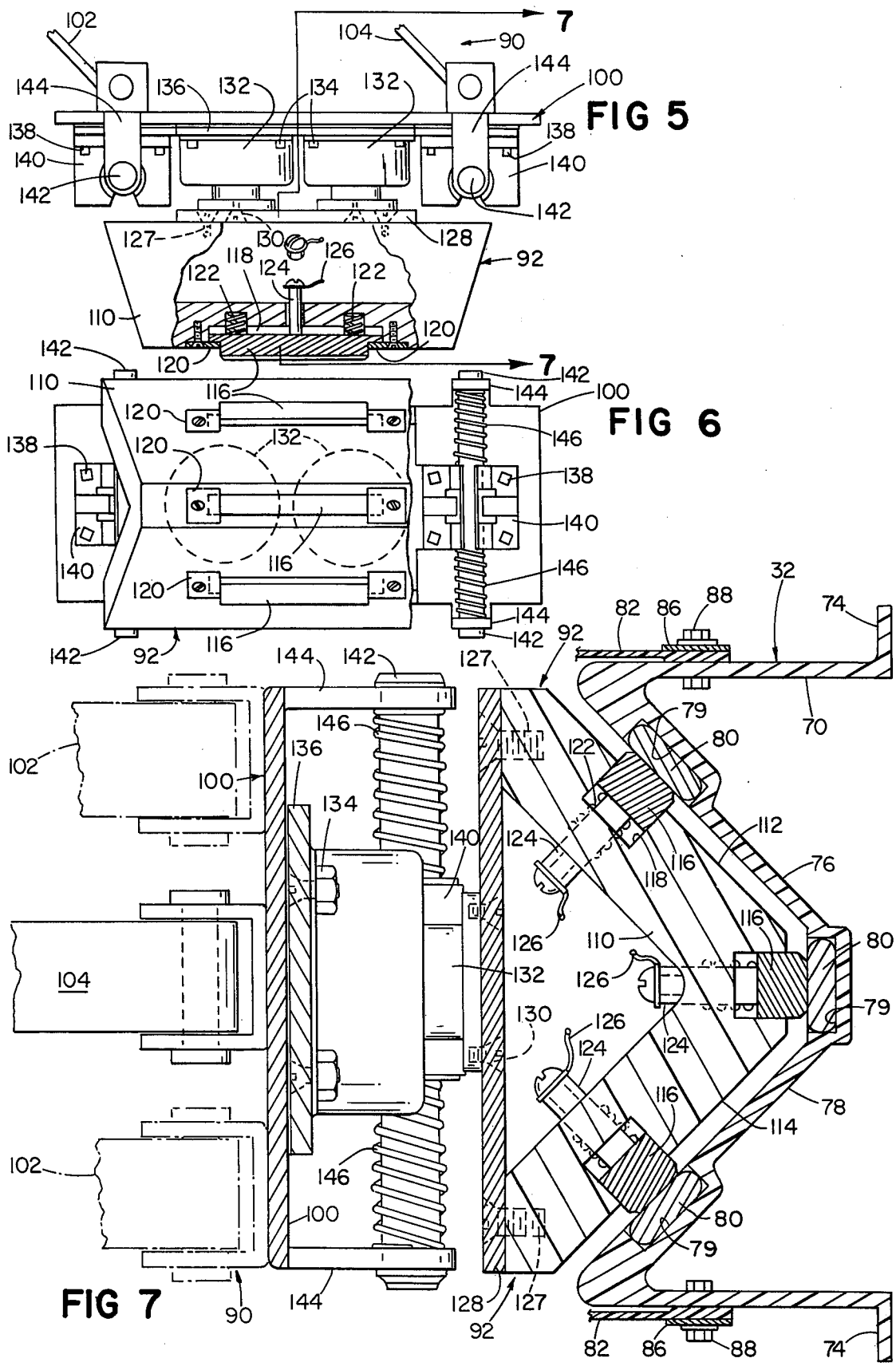

POWER SYSTEM

This application is a division of Ser. No. 121,263, filed Mar. 5, 1971, now U.S. Pat. No. 3,786,762 entitled 'Power System'.

SUMMARY OF INVENTION

This invention relates to vehicles using electrical power from power sources external of the vehicle, and to transportation systems utilizing such vehicles.

It is frequently desired to supply electrical power to a moving device such as a vehicle from a fixed electric power transmission system. Such a system is an individual vehicle commuter transportation system which includes an electrical distribution bus to supply electrical power to control and/or propel vehicles along a roadway system. A system of this type is described generally in U.S. Pat. No. 3,254,608. In such systems electrical power must be transmitted to the vehicle in a reliable manner. The application of power to the vehicle at a roadway junction must be facilitated. Also, the power supply arrangement should be economical, minimize the likelihood of harm to personnel, and be operable in a wide range of weather conditions.

An object of this invention is to provide novel and improved power supply systems for electrically powered vehicles, providing a safe and continuous external power source for rapid, efficient and non-hazardous vehicle movement.

Another object is to provide improved automated vehicle transportation systems, and vehicles therefor.

A further object of the invention is to provide a novel and improved power supply system for a transportation system that employs vehicles that have in-vehicle switching capability.

The invention features a transportation system in which vehicles powered by (or otherwise utilizing) electrical power follow a predetermined vehicle path. The system includes a power source extending along the vehicle path, and a power collector, electrically connectible to the power source for continuous power transfer, mounted through coupling structure to vehicle. The power source comprises structure defining a channel located to receive the power collector, which channel has opposed inside surfaces which taper inwardly of the channel, and power conductor structure exposed in this channel. The power collector head has outside surfaces which generally conform to the inside surfaces of the channel and power receiver structure exposed through the head. The power collector head is sized and structured to be received into sliding engagement with the power source channel with the power receiver structure in electrical contact with the power conductor structure. The coupling structure comprises retractor means for selectively inserting and retracting the power collector relative to the power source, so as to make or break electrical contact, and resilient coupling means constructed to permit relative movement of power receiver structure and power conductor structure during insertion of the power collector into the power source channel. The resultant self-aligning capabilities of the power source and power collector, provided by the matching configurations of the engaging head and channel, and the resilient cojpling provide efficient, rapid, and sure power switching.

In a preferred embodiment the power source is a single bus unit installed on either one side of the guideway or the other, except at junction points where two bus units are installed, one located along each side of the vehicle. The vehicle has two power collectors, one on each side, only one of which normally is engaged with a power source for vehicle propulsion or control. The two power sources diverge at a junction, the power collector engageable with the power source associated with the desired vehicle direction past the junction is readily engaged, to provide non-interrupted power transmission as the vehicle moves through the junction. Moreover, the grooved or recessed configuration of the power source has the further advantage that the exposed power-carrying conductors therein are sufficiently remotely located so as to minimize the risk of accidental contact, yet remain readily accessible for inspection and/or maintenance. Further safety is provided in a preferred embodiment by a flexible rubber insulating cover, shingled to exclude rain, snow, ice, etc. from the conductors. This cover automatically opens and closes as the power collector on the vehicle slides over the conductors. The cover will not support combustion and maintains its shape and flexibility over a temperature range of $-45°$ to $+165°F$.

In a particular embodiment, the power source assembly includes a molded fiberglass structure having inner surfaces disposed at an angle of 90° to one another, thus defining a V-shaped groove. The power conductor structure for a three phase installation includes three parallel continuous conductors, spaced apart from one another by the electrical insulating material of the channel, with one conductor located in each of the aforesaid inner surfaces of the groove and the third located at the junction of the two inside surfaces, at the innermost end of the groove. The power collector has, correspondingly, power receiver structure in the form of three contact members, also spaced apart from one another by electrical insulating material, and located for simultaneous independent engagement with the respective conductors in the channel structure.

In a particular power collector construction, the contact members are spring biased in the head so as to have a contact surface protrude past the surrounding surfaces of the head. The coupling means includes spring structure between the retractor and the head to permit relative movement of the head in a direction perpendicular both to the predetermined vehicle path and to the general direction of retractor movement. For example, the head may be slidably secured relative to the retractor structure and also supported on resilient mountings to allow limited angular movement of the head.

A preferred retractor means includes a pantograph linkage having one side secured to the vehicle, the opposite side resiliently coupled to the power collector, arms joining these sides, and drive means, such as a piston, secured to at least one arm, for expanding and contracting the linkage. Where the vehicle has a power collector on each side, advantageously a separate drive piston is arranged to operate each retractor, although a single dual acting piston system could be arranged to operate both retractors simultaneously in opposite directions.

Other objects, features and advantages will appear to one skilled in the art from the following description of a preferred embodiment of the invention, taken together with the attached drawings thereof, in which:

FIG. 3 is a top elevational view of the forward end of the chassis of an electrically powered vehicle and associated power sources;

FIG. 4 is a front elevational view of the vehicle and power sources of FIG. 3, with a portion broken away to show the mounting of the power collector and guide follower assemblies;

FIG. 5 is a top elevational view, partially broken away, of a power collector employed in the system shown in FIG. 1;

FIG. 6 is a side view, partially broken away, of the power collector of FIG. 5; and, FIG. 7 is an enlarged sectional view of the power collector of FIG. 5, taken along the line 7—7, together with an engaged power source.

DESCRIPTION OF PARTICULAR EMBODIMENT

Figure 1:
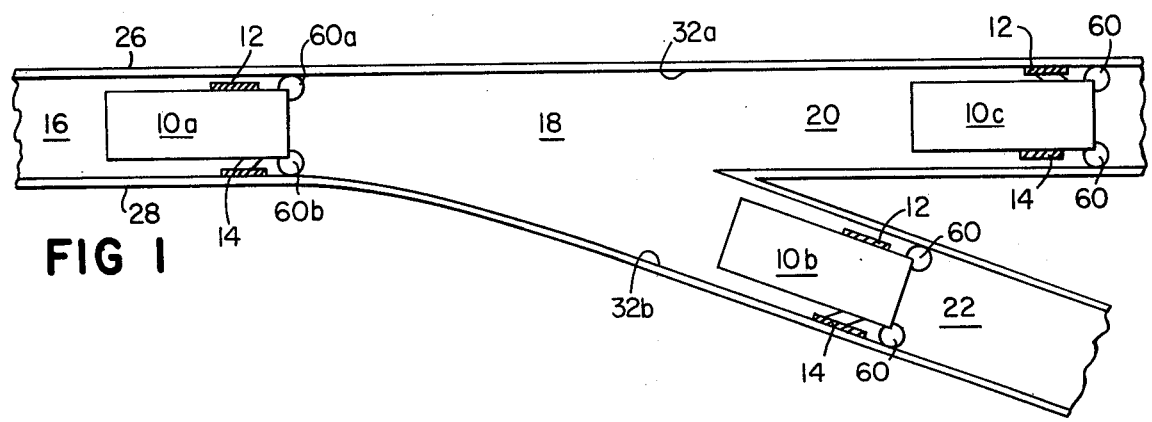
FIG. 1 is a schematic view of a junction-containing portion of an individual vehicle transportation system embodying the present invention.

FIG. 1 shows a portion of a system constructed in accordance with the present invention having vehicles 10 equipped with power collector systems 12, 14, and a path section 16 which separates at junction 18 into two path sections 20, 22. The invention might, for example, be employed in a travelling crane system, a commuter system, a system for transporting passengers between airport terminals, or moving baggage. In the illustrated system, each roadway has a smooth horizontal surface 24 (which may be paved with suitable asphalt material, for example, to increase the frictional coaction with the vehicle wheels that engage that surface) and, as indicated particularly in FIG. 4, two upstanding guide members 26, 28 for guide and safety purposes, disposed generally perpendicular to surface 24, each have a guide structure 30a, 30b and a power distributor structure 32a, 32b, respectively.

Referring now to FIGS. 3 and 4, each vehicle 10 has a chassis 40 on which are mounted foam-filled, rubber road tires 42, of which only the front two steerable tires 42a, 42b are shown in the figures. The rear tires would be typically driven by an electrically actuated drive system, such as that described in copending application Ser. No. 41,994, filed June 1, 1970, in the names of Morley et al., entitled "Transportation System" and assigned to the same assignee as this application. The front wheel assemblies are supported on axle 44 which is mounted on the vehicle frame 40 by a suitable resilient coupling such as brackets 46 and springs 48. Shock absorbers 50 are also secured between frame 40 and axle 44. At each end of the axle 44 is a conventional wheel support assembly 52 which allows the entire wheel structure to rotate about a vertical axis relative to the end of the axle 44. Follower structures 54a and 54b each include a connector strut 56, secured at one end to the corresponding wheel assembly and at its other end to cylinder 58. Each follower wheel 60a, 60b (inflated or foam-filled rubber) is rotatably secured to cylinder 58. A tie rod 62 is pivotally secured at its ends to web 64, and each web is secured to a corresponding strut 56.

The follower wheels 60 are thus steeringly connected to road tires 42, to provide a steering system such as disclosed in the assignee's copending application Ser. No. 41,954, filed June 1, 1970. In general, the steerable wheels are biased toward a selected one or the other of the guide members 30 in an invehicle switching arrangement so that the respective follower wheel engages that guide member, and the vehicle follows the direction of that guide member.

Figure 2:
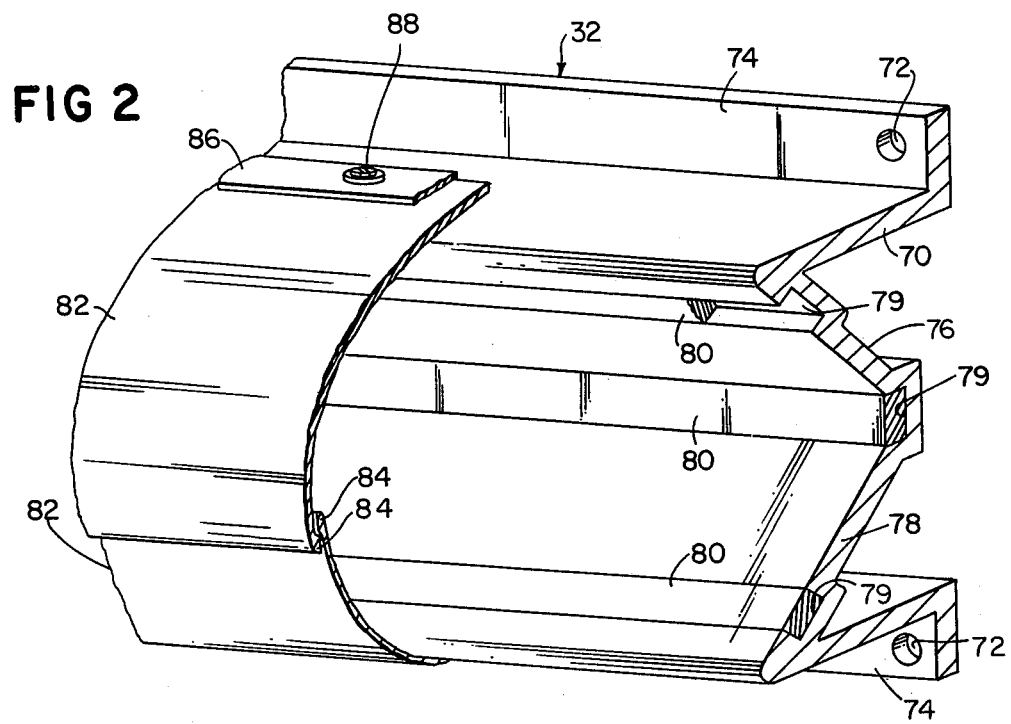
FIG. 2 is an isometric, somewhat diagrammatic view of a section of a power source employed in the system shown in FIG. 1.

Referring now to FIG. 2, each power rail structure 32 is in the form of a fixed continuous three-conductor busway which includes a support base 70, formed of a suitable electrical insulating material such as fiberglass or an extruded plastic that may have openings 72 disposed in its L-shaped end flanges 74 to receive appropriate fastenings for securing to the guide members 26, 28. The base has two planar wall sections 76, 78 (that define an included angle of 90°) between the two end flanges 74 forming a V-shaped channel which in a 220-volt three-phase AC system is about 2 inches deep and 5 inches wide and having three axially extending recesses 79 therein. A copper bus bar 80 (about one-fourth inch by three-fourths inch in cross-section) is secured in each recess 79 in the channel by suitable means such as countersunk bolts. The size of bus bars are a function of factors such as system load and allowable voltage drop in a 575 volt AC system, for example bus bars of one square inch cross-section are employed. Although the illustrated three-phase AC system employs three conductors or bus bars, other bus bar configuration may be used in appropriate systems--e.g., a DC system would employ a two-bus bar arrangement (using one bus as ground). A pair of flexible sheets 82 of rubber or other suitable insulating material may be employed to provide a cover for the busways along their lengths except at switching points. The sheets are normally disposed in shingled configuration and include lips 84 which are engaged to maintain the shingle configuration. Clamp strips 86 and fasteners 88 secure the sheets 82 to support 70.

Each power collector assembly 12, 14 comprises a pantograph linkage support system 90 (diagrammatically indicated in FIGS. 3 and 4) and a collector shoe structure 92. The rear plate 94 of each support system 90 is mounted on a support 96, which in turn is secured, by a connecting bracket 98, to the axle assembly 44. Between rear support plate 94 and its cooperating front support plate 100 are mounted the linkage arms 102, 104, one of arms 102 having pivotally connected thereto a connecting rod 106, the other end of which is connected to an appropriate piston contained in a fluid actuated cylinder 108 pivotally mounted on support bracket 98.

Referring now to FIGS. 5-7, each collector shoe structure 92 has a tapered head 110, formed of electrical insulating material such as a fiber reinforced polyester of which the two outer surfaces 112, 114 are disposed to one another at a 90° angle. Three parallel contact members or conductor bars 116 are each received in corresponding recesses 118. Each bar 116 is held in place by clamp blocks 120 and biased outwardly by springs 122 so as to project through the head beyond surfaces 112, 114. Rearwardly extending studs 124 provide terminals for connection of cables 126 to the vehicle's electrical system. The distances between the adjacent conductor bars, and their locations on head 110 correspond to the distances between and the location of the bars 80, respectively, in power source base 70. Thus, positioning of power collector head 92 with power source structure 32 results in electrical engagement of substantial surface areas of the conductor bars 116 with the adjacent bus bars 80 providing good electrical connection therebetween, as shown in FIG. 7.

To provide for easy, rapid alignment between each conductor bar 116 and the respective bus bar 80, resilient connections are provided between each head 92 and its pantograph support system 90. The collector head 92 is secured by fasteners 127 to a head support plate 128 which is in turn secured by fasteners 130 to mounts 132. Mounts 132 are in turn secured by fasteners 134 to support plate 136. Secured to each end of plate 136 by fasteners 138 is a pillow block 140 that receives a support shaft 142. Each support shaft 142 is secured between a pair of brackets 144 which project from pantograph plate 100. Springs 146 allow vertical movement of each pillow block 140 and plate 136 as a unit relative to brackets 144 and thus vertical movement of the collector head 92 relative to its pantograph system 90. Springs 146, being equally sized, also tend to center each pillow block 140 on the respective shaft 142. The mounts 132 allow resilient twisting movement of each head 92 about axes parallel and (horizontally) perpendicular to the direction of rail 32. Thus a threefold resilient support system is provided for each conductor bar by springs 122, mounts 132, and springs 146.

In operation, during travel of the vehicle along the roadway, one or the other of the cylinders 108 is actuated so as to cause either power collector head 92a or 92b to engage the respective power rail 32a or 32b. Consider the vehicle 10a approaching the junction 18 of FIG. 1. Its steering mechanism is biased so that one of its follower wheels 60 is in engagement with guide member 30a or 30b and its power collector 14 is slidably engaged with power rail 32b to provide vehicle power. The engaged power rail may conveniently be, but need not be, on the same support member 26 or 28 as carries the then utilized guide follower rail 30. If the vehicle 10a is to follow vehicle 10b, its follower wheel 60b must be biased against follower rail 30b, and power collector 14 continues to engage the power rail 32b.

However, if vehicle 10a is to follow vehicle 10c, it is necessary not only that the vehicle switch be actuated to bias follower wheel 60a into engagement with guide rail 30a, but also that power collector 12 be engaged with the power rail 32a. To accomplish this, appropriate switching means responsive, for example, to a fixed junction indicator causes the proper power collector to engage its corresponding power rail. (At such switching point, as indicated above, the cover members 80 are omitted—or suitably modified—to permit ready engagement of the collectors with the power rails.) Such switching may be actuated, e.g., in accordance with a directional program set for the vehicle when it enters the roadway system. Thus the switching is done automatically and no manual steering or manual actuation of the in-vehicle switching mechanism of the vehicles is necessary. To switch power collectors, the direction of fluid pressure in each cylinder 108 is reversed, so that one pantograph linkage 90 is extended and the other retracted, thereby inserting the collector head of collector 14 into the groove of its power rail 326 before the junction (avoiding interruption of power to the vehicle).

The nesting configurations of each collector head 92 and power rail 32, in cooperation with the resilient support for head 92, results in automatic alignment of the collector head and the respective power rail, and rapid and independent electrical connection for power transfer between each bus bar and the respective conductor bar. Such rapid electrical switching ability also permits ready alteration capability of a desired vehicle path past a junction. In addition, the spring-biased conductors and the fluid pressure biasing maintain constant, steady electrical connection between the power rail 32 and collector head 92 even during minor surface irregularities.

If the steering system is also fluid actuated (by a hydraulic or pneumatic system) the power collector cylinders may be operated coordinately with the steering control. Thus, as the bias is shifted from one guide wheel 60 to the other, so, too, is the engaged power collector head 92 shifted.

While the system has been described for road vehicles, it is of course suitable for other power-driven vehicles, and for overhead or under power rails, as well as the illustrated horizontal rails. Also, although there are two continuous power sources 32 shown, it should be understood that along most roadway stretches only one power source need be provided, two being necessary only at junctions. The rapid switching and engaging ability of the disclosed power collectors enables shorter duplicated power sources to be used.

Other embodiments will occur to those skilled in the art and are within the following claims.

What is claimed is:

1. A power collector for an electrically powered vehicle adapted for sliding engagement with a continuous power source extending along a predetermined vehicle path and insertion into and removal from said power source at any point along the length thereof, said power source comprising a channel of electrically insulating material that has opposed surfaces that taper inwardly of the channel towards one another and a plurality of exposed electrically conductive bus bar structures extending the length of said channel parallel to one another along inner surfaces of said channel, said power collector comprising an elongated head of tapered cross-sectional configuration having two opposed outer surfaces disposed at an angle to one another and that meet at an apex, and a plurality of electrical contact structures, at least one contact structure being exposed at each said opposed outer surface and defining a contact surface for electrical engagement with a corresponding bus bar of said power source when said elongated head is inserted into said channel.

2. The power collector of claim 1 wherein said members are mounted in said head by spring means biasing said members to protrude past the adjacent outside surface of said head.

3. The power collector as claimed in claim 1 and further including retractor means for selectively inserting and retracting said tapered head into and from said channel and resilient means connecting said retractor means with said elongated head to permit angular movement of said elongated head relative to said channel during insertion of said elongated head into said channel.

4. The power collector as claimed in claim 3 wherein said elongated head is of generally triangular cross-sectional configuration and said two opposed surfaces are planar surfaces that meet at said apex, said apex extending along the length of said elongated head, and said plurality of electrical contact structures includes three elongated contact structures spaced from one another, one elongated contact structure being disposed along each said opposed surface intermediate the lateral boundaries thereof and the third elongated contact structure being disposed along said apex.

5. The power collector as claimed in claim 4 wherein each said elongated contact structure extends along the length of said elongated head, said elongated contact structures being disposed parallel to one another and being biased outwardly beyond the adjacent outer surface of said elongated head for sliding engagement with the corresponding bus bars of said power source.

* * * * *